UNITED STATES PATENT OFFICE.

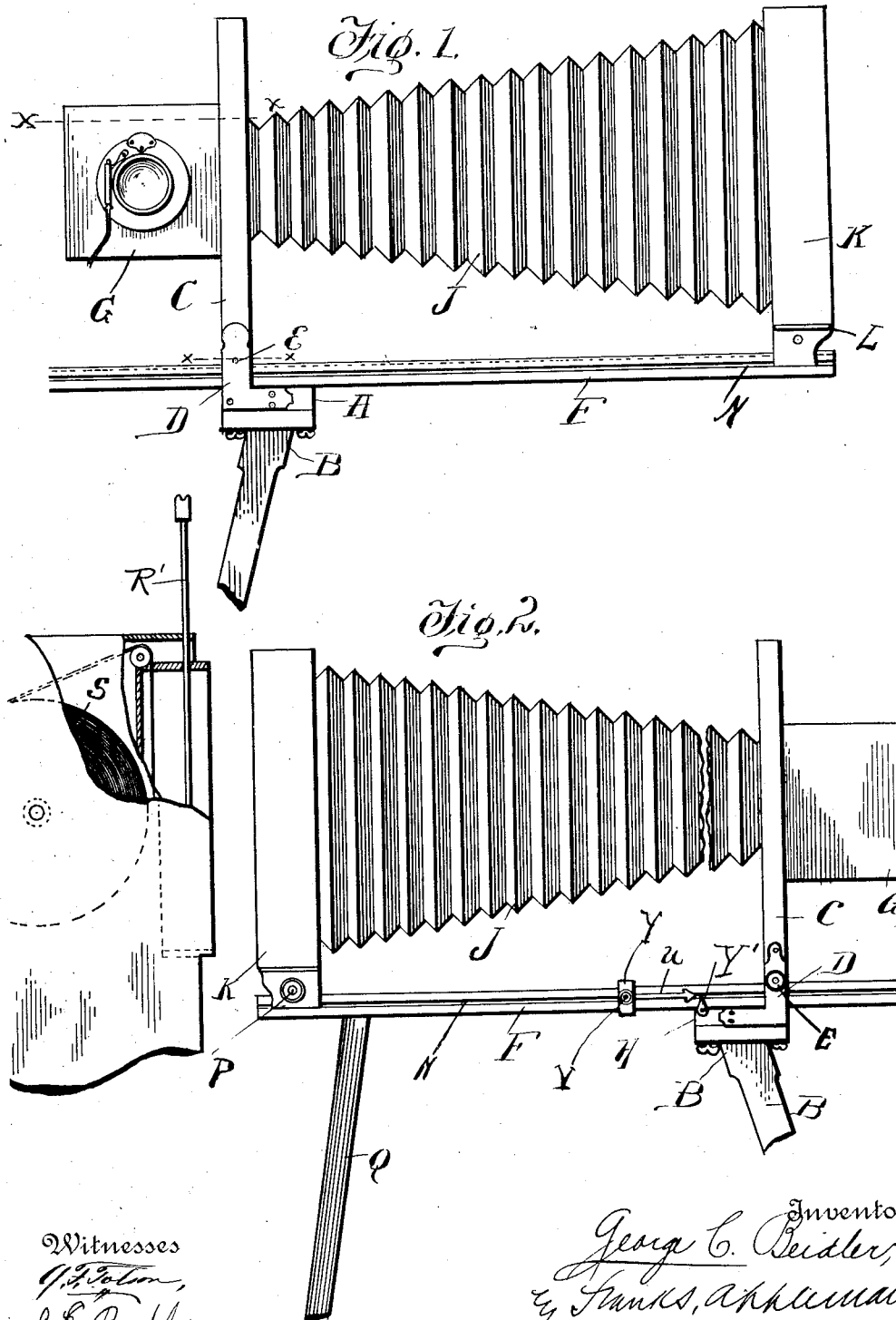

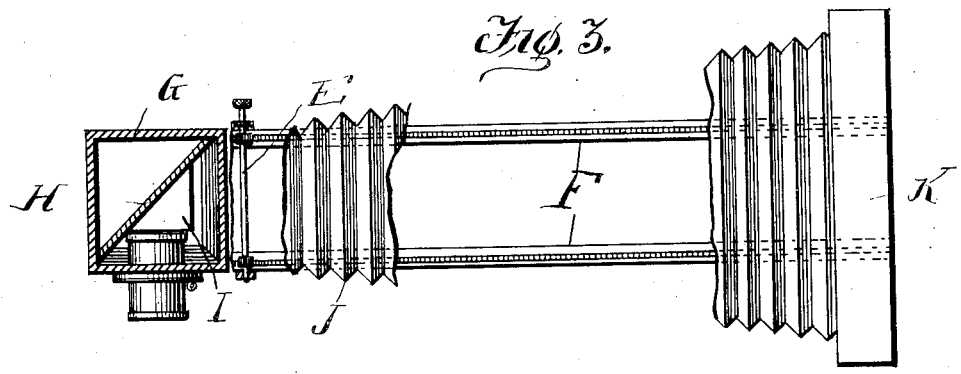
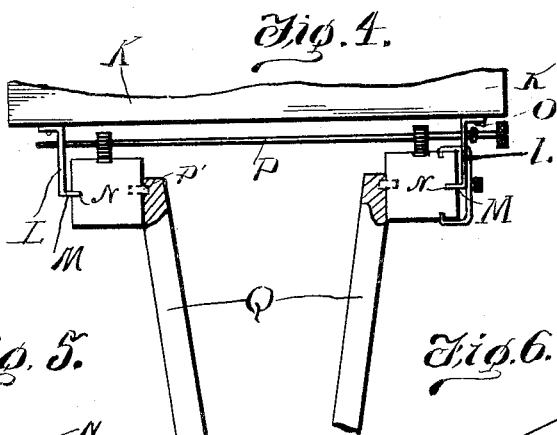
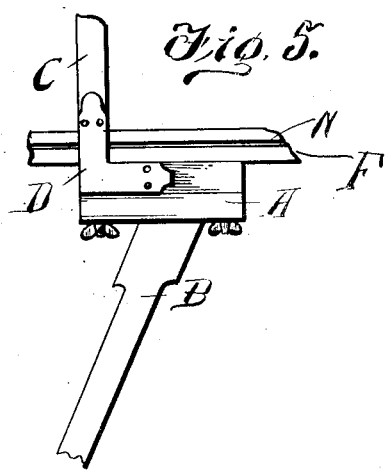
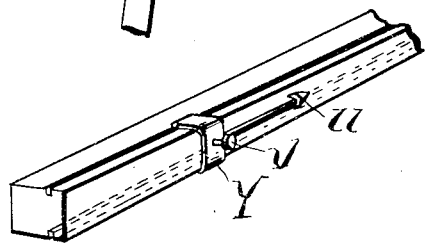
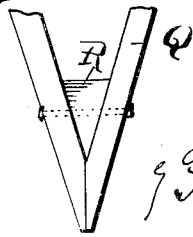

GEORGE C. BEIDLER, OF OKLAHOMA, OKLAHOMA.

CAMERA.

1,082,727.

Specification of Letters Patent. Patented Dec. 30, 1913.

Application filed September 26, 1907. Serial No. 394,707.

*To all whom it may concern:*

Be it known that I, GEORGE C. BEIDLER, a citizen of the United States of America, residing at Oklahoma city, in the county of Oklahoma and State of Oklahoma, have invented certain new and useful Improvements in Cameras, of which the following is a specification.

This invention relates to photography and particularly to a means for focusing a camera, but permitting the lens to remain stationary.

The invention is designed primarily for use in conjunction with my book holder patented July 4, 1905, and numbered 793,978; the said invention being also adapted for use on a photographing and developing apparatus similar to that covered in patent of January 23, 1906, and numbered 810,388.

In order to attain the best results and facilitate the work of photographing, I have found it desirable to place the book holder and lens in fixed relation, for the reason that the book holder must be stationed in position to obtain a proper light on the object. I also prefer to have the lens box and lens situated in front of the book holder, and by moving the position of the sensitized element, with relation to the camera box, find the focus and obviate thereby any movement of the lens and box with relation to the copy holder.

I accomplish the result stated, and also produce an apparatus of the character noted, possessing advantages in points of efficiency and simplicity, and proving comparatively inexpensive.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a side elevation of a camera embodying the invention, one support being omitted; Fig. 2, is a similar view of the opposite side of the camera with the support applied, and the holder of the sensitized element shown detached from the camera; Fig. 3, is a combined plan view with a part of the bellows broken away, and a horizontal sectional view of the lens box; Fig. 4, is a rear end view of the camera with parts broken away and in section; Fig. 5, is an enlarged detail view of the camera stand; Fig. 6, is a perspective view of one rail of the frame with a gage applied; and Fig. 7, is a detail view of the legs.

In these drawings A, denotes a head supported by an inclined standard B. The front board C, has the usual slot and setting device, and angle plates D; one of such plates being on each side of the front board, and forming a bearing for a pinion shaft E, for adjusting the bed F, with relation to the front board; the said bed being slidable with relation to the front board and provided with racks as in ordinary cameras. The lens box G, has a vertical partition H, extending diagonally; the said partition supporting a prism I, having one side alining with the lens and another side alining with an opening in the front board to which the bellows J, is secured.

The bed, as stated, is slidable with relation to the front board and lens, and the bellows frame K, has angular brackets L, with angular ends M, adapted to travel in slots N, in the sides of the bed. The brackets support the bellows frame and are preferably provided with fastenings O, to prevent movement of the brackets or bellows frame independently. The brackets further act as bearings for the pinion shaft P, provided for moving the bellows frame with relation to the lens. The adjustment of the bellows frame is supposed to be quite limited for the reason that the adjustment of the bed is for the purpose of obtaining a nearly exact focus, while the movement provided for the bellows frame is designed only for minute adjustment.

For the purpose of supporting the bed under the bellows frame, the rails of the bed are provided with dowels P', on which the legs Q, of the support fit. The legs converge at the bottom and have a block R, between them to which the legs are bolted.

In focusing the camera, the bed is moved in the manner described until an approximate or almost exact focus is attained; (it being understood that the bellows frame is provided with a temporary ground glass) and then to complete the focus the bellows frame is slightly moved.

The apparatus so far described, is designed for use in connection with the exposure chamber and developing apparatus before mentioned, and in order to employ a slide such as R', the sensitized element S (here shown as a film wound on a roll) travels or is stationed back of the slide, and hence there is a distance between the mouth of the exposure chamber and the sensitized element, which distance is sufficient to cause the sensitized element to be out of focus for the reason that the said element cannot, without further provision, be moved to the position assumed by the ground glass. I therefore provide an adjustment of the bellows frame with relation to the lens, to make it possible for the sensitized element to occupy the same position with relation to the lens, as the ground glass occupied with relation to said lens, when focused. To carry out said object, and to make the camera applicable for use with apparatus in which the distance from the mouth of the exposure chamber to the sensitized element might vary from that illustrated, I provide a gage for determining the distance the bellows frame has to be moved after the focus in order to allow the sensitized element to assume the position held by the ground glass. I therefore fix a pointer Y', preferably near the edge of the head or in fixed relation to some stationary object which the gage may abut. I then have the gage which consists of the sliding member Y, and the arrow u, slidably mounted on the bed and provide the gage with a set screw V. The set screw retains the gage in adjusted position, and the gage is in such proportion to the distance between the mouth of the exposure chamber and sensitized element, that the gage, when secured to the bed with the end of the arrow at the pointer, will permit a sliding movement of the bed on the head a distance proportionate to the distance between the mouth of the exposure chamber and sensitized element. When the bed has been moved the predetermined distance, the member Y, of the gage will abut the fixed portion of the apparatus; and when the exposure chamber is applied to the bellows frame, the sensitized element will be in focus.

What I claim is:

1. In a photographing apparatus a lens box having a support, a bed slidable with relation to the support and lens box, a bellows having one end in communication with the lens box and having a bellows frame on the opposite end thereof, means for loosely connecting the bellows frame to the bed to permit the movement of the bellows frame with relation to the bed, a holder for a sensitized element having the sensitized element lying back of an opening in said holder, the said holder and bellows being adapted to coact for exposing the sensitized element through the bellows, a sliding member applied to the bed, an arrow on said sliding member equal in length to the distance between the bellows frame and the sensitized element, when the holder and bellows frame are together in operative relation, means whereby the sliding member is secured against movement on the bed and means abutted by the sliding member for arresting the bed when the sliding member contacts therewith.

2. In a photographing apparatus a lens box, a support for the lens box, a bed slidable with relation to the support and lens, a bellows having one end in communication with the lens box, a bellows frame on the end of the bellows remote from the lens box, brackets connected to the lens box, the said bed having slots to receive the ends of the brackets to permit sliding movement of the brackets with relation to the bed, a holder for a sensitized element having an opening, and means for holding the sensitized element back of the opening, the said sensitized element and bellows frame coacting, a gage equal in length to the distance between the sensitized element and the bellows frame, means for setting the gage on the bed whereby said gage is temporarily immovable and means for limiting the movement of the bed beyond a distance equal to that of the length of the gage.

3. In a photographing apparatus, a lens box, a support for the lens box, a bed slidable with relation to the support and lens box, a bellows, a bellows frame, means for movably supporting the bellows frame on the bed, a holder for a sensitized element adapted to be connected to the bellows frame, means for supporting the sensitized element in the holder, means for focusing the apparatus, a gage equal in length to the distance between the sensitized element and the mouth of the holder of said sensitized element, means for attaching the gage to the bed to move with the bed, and means contacted by the gage when the bed has moved a distance equal to the length of the gage.

In testimony whereof I hereby affix my signature in the presence of two witnesses, this 18th day of September, 1907.

GEORGE C. BEIDLER.

Witnesses:
 HENRY H. SUMER,
 EDWARD H. GILMAN.